Dec. 6, 1938. R. J. GUBA 2,139,495
WIRE FABRIC BELT STRUCTURE
Filed Aug. 4, 1938
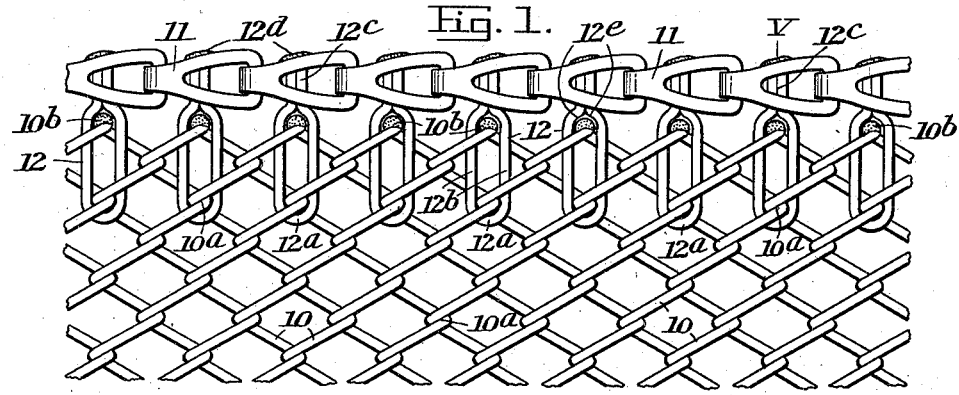
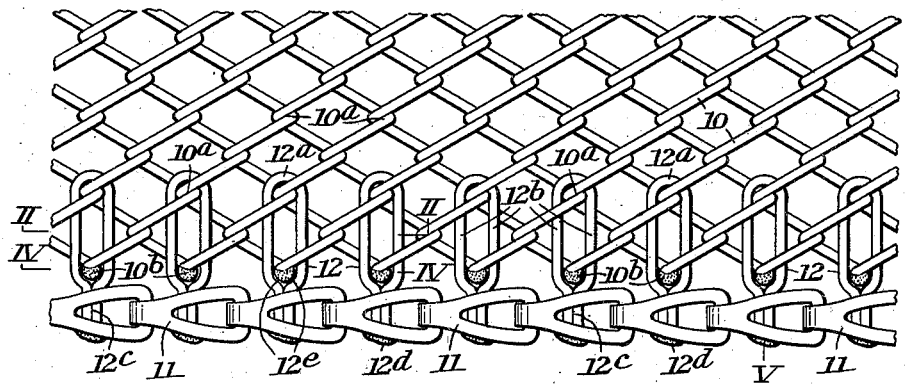
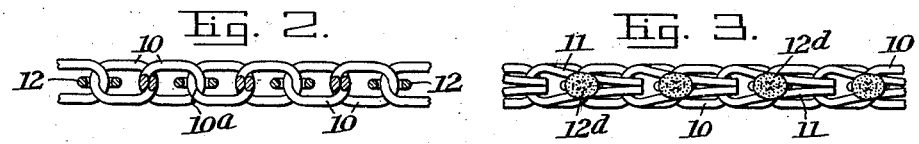
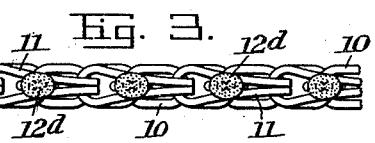
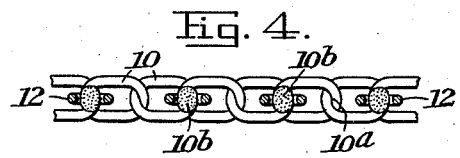
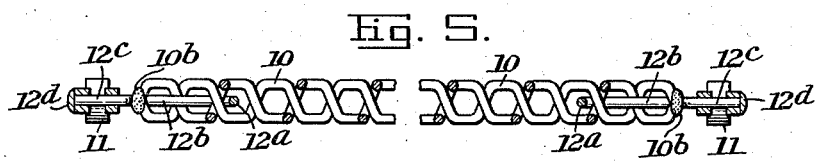
Inventor
Raymond J. Guba
by
Atty.

Patented Dec. 6, 1938

2,139,495

UNITED STATES PATENT OFFICE 2,139,495

WIRE FABRIC BELT STRUCTURE

Raymond J. Guba, Philadelphia, Pa., assignor to Audubon Wire Cloth Corporation, Philadelphia, Pa., a corporation of New Jersey Application August 4, 1938, Serial No. 223,075

8 Claims. (Cl. 245—10)

My invention relates to belt structures made of wire fabric comprising helically coiled strands in interengaging relation, and one object of my invention is to provide a belt of such type with reinforcing means at or adjacent to its marginal edges; pairs of the belt wires throughout the belt structure being preferably in permanently connected condition at their ends, and such ends are preferably in alignment longitudinally of the belt structure.

A further object of my invention is to provide the marginal edges of the belt fabric with reinforcing means which may be in the form of chains or pivotally connected links which serve to protect such edges and increase the tensile strength of the belt structure.

And a still further object of my invention is to provide independent means for attaching the reinforcing chains or pivotally connected links to the wires of the belt fabric; such means comprising connector elements which are in looped engagement with interconnecting bights of directly adjacent belt wires, which may be those belt wires whose ends are permanently connected together. The outer ends of the looped connectors are permanently secured, as by welding, to the chains or the links thereof. Such looped connectors are readily removable and replaceable if and when repairs are necessary to be made as by the insertion of fresh belt wires to take the place of those that may break or become damaged in use.

These and other features of my invention are more fully set forth hereinafter; reference being had to the accompanying drawing, in which:

Figure 1 is a plan view; partly broken away, of a portion of a wire fabric belt structure within the scope of my invention.

Fig. 2 is a fragmentary sectional view on the line II—II, Fig. 1.

Fig. 3 is a view of a portion of the marginal edge of the belt structure.

Fig. 4 is a fragmentary sectional view on the line IV—IV, Fig. 1, and

Fig. 5 is a cross sectional view of the belt structure on the line V—V, Fig. 1.

The wire fabric employed in my improved belt structure and shown in the several views may be of usual type; comprising helically coiled wires of one twist (either right-hand twist or left-hand twist) indicated at 10, in interlocked or interconnected relation, as indicated at 10$^a$.

The belt wires are preferably arranged in unit pairs with the ends of such unit pairs permanently connected together, as by welding, as indicated at 10$^b$; such connected ends being in alignment at the marginal edges of the fabric.

Adjacent to each marginal edge of the belt I provide a chain of conventional type, made up of pivotally connected links 11 which may be in the form of apertured loops in the usual interengaged relation; the links being of such shape as to provide spaces between upper and lower portions of the same.

For the purpose of connecting these chains or interconnected links with the marginal edge portions of the belt fabric, I provide looped connector elements 12, whose bights 12$^a$ engage interconnected bights 10$^a$ of pairs of the belt wires inwardly of the marginal edges of the fabric; the legs 12$^b$ of such links lying within the helices of the belt wires and preferably enclosing the ends of connected pairs of wires. The ends of these legs may be bent into meeting relation as indicated at 12$^c$, and these contracted portions extend into the spaces between upper and lower portions of the respective links and are welded thereto, as indicated at 12$^d$.

The position of the connectors provides for definite positioning of the chain links with respect to the marginal edges of the belt fabric, and the connected ends of pairs of the belt wires preferably lie within the looped connectors at or adjacent to the inner curved shoulders 12$^e$ of the latter.

Should a belt wire break or become damaged, it is only necessary to remove the looped connectors adjacent such damaged part and replace such wires without further consideration of the wire fabric or the chains, and such looped connectors are readily replaceable in the event of breakage or other damage. The wire fabric is entirely independent of the chains, and the chains are entirely independent of the wire fabric; the looped connectors serving to join the parts which make up my improved belt structure.

It will be understood of course that the looped connectors may be longer than those illustrated with their bights in engagement with interconnected bights of the belt wires at a greater distance from the margin of the wire fabric, without departing from my invention, and that short looped connectors may alternate or be disposed in any other suitable relation with respect to the looped connectors of greater length.

It will also be understood that while I have shown and described a certain embodiment of my invention, modifications may be made in the character of the wire fabric; the interconnected links or chains paralleling the marginal edges of the same, and the looped connectors which couple the wire fabric with the chains, without departing from the spirit of my invention; all of which is deemed to be within the scope of the appended claims.

I claim:

1. A wire fabric belt structure comprising helically coiled wires in interconnected relation with pairs of said wires connected at their ends, a chain of interconnected links adjacent the marginal edge of the wire fabric, and separate looped connectors in engagement with interconnected bights of pairs of the belt wires and permanently attached to the chain links.

2. A wire fabric belt structure comprising helically coiled wires in interconnected relation with pairs of said wires connected at their ends, chains of interconnected links adjacent the marginal edges of the wire fabric, and looped connectors in engagement with interconnected bights of the connected pairs of the belt wires and having their free ends welded to the chain links.

3. A wire fabric belt structure comprising a plurality of helically coiled wires in interconnected relation with pairs of said wires in transverse alignment; said pairs of wires hinging on adjacent wires, a chain of interconnected links adjacent the marginal edge of the wire fabric, and looped connectors in engagement with interconnected bights of the connected pairs of the belt wires and enclosing said connected ends; said looped connectors being welded to the chain links.

4. A wire fabric belt structure made of helically coiled wires in interconnected relation, chains of interconnected links adjacent to the marginal edges of the belt fabric and with their pivotal connections in registry with the interconnected bights of the belt wires, and looped connectors engaging bights of the belt wires inwardly of the marginal edges of the fabric and having their free ends permanently connected to the chain links.

5. A wire fabric belt structure made of helically coiled wires in interconnected relation, chains of interconnected links paralleling the marginal edges of the belt fabric and with their pivotal connections in registry with the interconnected bights of the belt wires, and looped connectors engaging bights of the belt wires inwardly of the marginal edges of the fabric and having their free ends welded to the chain links.

6. A wire fabric belt structure comprising helically coiled wires in interconnected relation with pairs having connected ends, chains of interconnected links adjacent the marginal edges of the belt fabric and with their pivotal connections in registry with the interconnected bights of the belt wires, and looped connectors engaging bights of pairs of the belt wires inwardly of their connected ends and having their free ends permanently connected to the chain links.

7. A wire fabric belt structure comprising transversely arranged helically coiled interengaging wires arranged in pairs and hinging on each other with the ends of each pair in permanent engagement, a series of interconnected links arranged at a marginal edge of the belt structure, and looped connectors lying within the helices of the belt and in engagement with interengaging bights of the same and having their outer ends permanently connected to links at the marginal edge of the belt structure.

8. A wire fabric belt structure comprising transversely arranged helically coiled interengaging wires arranged in pairs and hinging on each other with the ends of each pair in permanent engagement, a series of interconnected links arranged at each marginal edge of the belt structure and spaced therefrom, and looped connectors in engagement with interengaging bights of pairs of the belt wires and having their outer ends welded to said links.

RAYMOND J. GUBA.